US010700882B2

(12) United States Patent
Mirza et al.

(10) Patent No.: US 10,700,882 B2
(45) Date of Patent: Jun. 30, 2020

(54) GX SESSION RECOVERY FOR POLICY AND CHARGING RULES FUNCTION

(71) Applicant: T-Mobile USA, Inc., Bellevue, WA (US)

(72) Inventors: Khurram Ahmad Mirza, Bellevue, WA (US); Kalyan Kalepu, Sammamish, WA (US); Boris Antsev, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/111,101

(22) Filed: Aug. 23, 2018

(65) Prior Publication Data

US 2020/0044879 A1 Feb. 6, 2020

Related U.S. Application Data

(60) Provisional application No. 62/712,450, filed on Jul. 31, 2018.

(51) Int. Cl.
*H04W 48/18* (2009.01)
*H04L 12/14* (2006.01)
*H04L 29/12* (2006.01)
*H04L 29/06* (2006.01)
*H04L 12/66* (2006.01)

(52) U.S. Cl.
CPC .......... *H04L 12/1407* (2013.01); *H04L 12/66* (2013.01); *H04L 61/2007* (2013.01); *H04L 65/1016* (2013.01)

(58) Field of Classification Search
CPC . H04L 12/1407; H04L 12/66; H04L 61/2007; H04L 65/1016
See application file for complete search history.

(56) References Cited

U.S. PATENT DOCUMENTS

| | | | |
|---|---|---|---|
| 9,137,652 B2 * | 9/2015 | Zhou | H04M 15/00 |
| 9,370,037 B2 * | 6/2016 | Avula | H04W 56/002 |
| 9,621,362 B2 * | 4/2017 | Livanos | H04M 15/66 |
| 10,148,509 B2 * | 12/2018 | Rajagopalan | H04L 41/0893 |
| 2012/0265888 A1 * | 10/2012 | Roeland | H04L 12/14 709/228 |
| 2013/0279406 A1 * | 10/2013 | Merino Vazquez | H04L 65/1016 370/328 |
| 2014/0301191 A1 * | 10/2014 | Ludwig | H04L 45/72 370/230 |
| 2015/0055446 A1 * | 2/2015 | Avula | H04W 56/002 370/216 |
| 2016/0057788 A1 * | 2/2016 | Sharma | H04L 65/80 370/329 |
| 2018/0309800 A1 * | 10/2018 | Aravamudhan | H04L 65/1069 |
| 2019/0045357 A1 * | 2/2019 | Cooper | H04W 8/26 |

* cited by examiner

Primary Examiner — Sithu Ko
(74) Attorney, Agent, or Firm — Lee & Hayes, P.C.

(57) ABSTRACT

A Policy and Charging Rules Function (PCRF) can maintain a mapping table that associates gateway identifiers of gateways in a packet core network with corresponding IP address ranges. Based on an IP address of user equipment (UE), the PCRF can identify which of the IP address ranges in the mapping table over the UE's IP address, and which gateway identifier is mapped to that IP address range. The PCRF can accordingly contact the identified gateway to establish a Gx session for the UE with the gateway, such as restoring a previous Gx session or establishing a new Gx session.

20 Claims, 4 Drawing Sheets

Mapping Table
122

| Gateway Identifier 202 | UE IP Address Range 204 |
|---|---|
| Gateway Identifier 202A | UE IP Address Range 204A |
| Gateway Identifier 202B | UE IP Address Range 204B |
| ... | ... |
| Gateway Identifier 202N | UE IP Address Range 204N |

FIG. 2

GX SESSION RECOVERY FOR POLICY AND CHARGING RULES FUNCTION

RELATED APPLICATIONS

This U.S. Patent Application claims priority to provisional U.S. Patent Application No. 62/712,450, entitled "Gx Session Recovery for Policy and Charging Rules Function," filed on Jul. 31, 2018, the entirety of which is incorporated herein by reference.

BACKGROUND

In a telecommunication network, Policy and Charging Control (PCC) systems can be used to manage network resources and/or charge customer accounts. For example, PCC systems can be used to set up dedicated bearers for a particular communication session. PCC systems can also enforce policies applicable to a communication session by applying PCC rules to data packets of the communication session.

For example, user equipment (UE) can initiate a voice call by sending a request through a packet core network to a Proxy-Call Session Control Function (P-CSCF) of an IP Multimedia Subsystem (IMS). The P-CSCF can determine that a dedicated bearer for the voice call should be set up in the packet core network, and accordingly send a request for such a dedicated bearer to a Policy and Charging Rules Function (PCRF). The PCRF can identify PCC rules applicable to a dedicated bearer for voice call traffic associated with the UE, and send the PCC rules to a Packet Data Network (PDN) Gateway (P-GW) associated with the UE. Receipt of the PCC rules can cause the P-GW to set up the dedicated bearer and apply the PCC rules to data packets of the voice call on the dedicated bearer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 depicts an example of a mapping table that maps gateway identifiers to user equipment (UE) IP address ranges.

DETAILED DESCRIPTION

Introduction

Figure 1:
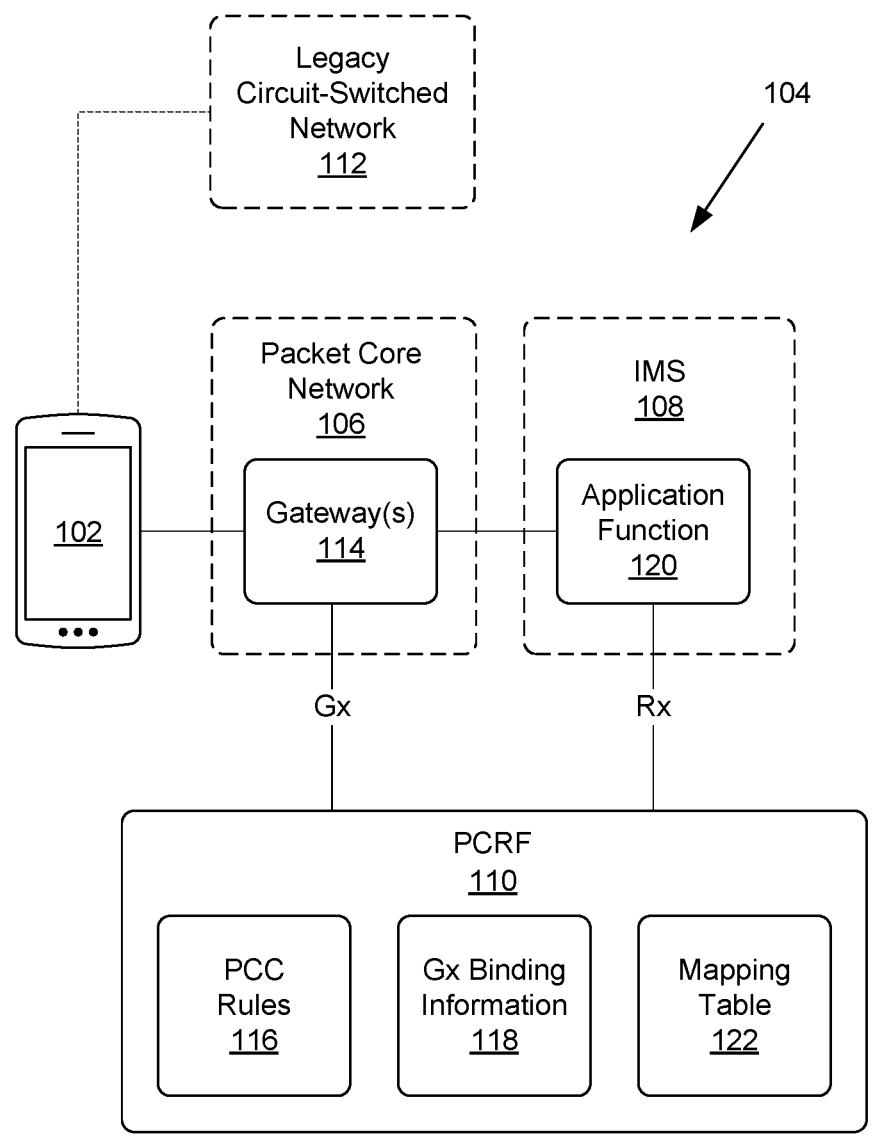
FIG. 1 depicts an example network environment including a packet core network, an IP Multimedia Subsystem (IMS), and a Policy and Charging Rules Function (PCRF).

A telecommunication network can include one or more packet-switched networks that handle voice calls and other communications sessions by processing and routing data packets. Packet-switched networks can include many 5G and 4G networks, such as a Long Term Evolution (LTE) network. A telecommunication network can also include one or more circuit-switched networks that handle such communications transmitting data through dedicated circuits established between network nodes. Circuit-switched networks can include many 2G and 3G networks.

A packet-switched network can include a packet core network, an IP Multimedia Subsystem (IMS), and a Policy and Charging Rules Function (PCRF). The packet core network can process and route data packets, the IMS can set up and/or manage communication sessions that use such data packets, and the PCRF can provide Policy and Charging Control (PCC) rules defining how such data packets should be processed by the packet core network.

A PCRF can be connected via Gx interfaces to gateways of the packet core network, such as Packet Data Network (PDN) Gateways (P-GWs). When a particular piece of user equipment (UE) connects to a particular gateway, the gateway and PCRF can establish a Gx session to exchange information about communications associated with that UE. The PCRF can store Gx binding information about such established Gx sessions.

A PCRF can also be connected via Rx interfaces to application functions, such as Proxy Call Session Control Functions (P-CSCFs), of at least one IMS. When an application function receives a request from a UE regarding a particular service, it can use an Rx session to send an Authorize/Authenticate Request (AAR) message to the PCRF that requests setup or modification of resources in the packet core network for the UE, such as setup, modification, or teardown of a dedicated bearer for the service. The PCRF can use its stored Gx binding information to identify a Gx session previously established with the gateway handling traffic for the UE. The PCRF can accordingly send new or updated PCC rules to that gateway over the established Gx session. In response to receipt of the PCC rules, the gateway can set up or modify resources in the packet core network and apply the PCC rules to those resources. The PCRF can then return an Authorize/Authenticate Answer (AAA) message to the application function confirming that the requested resources have been set up or modified.

As an example of this process, a UE can send a Session Initiation Protocol (SIP) message that requests setup of a Voice over LTE (VoLTE) call to a P-CSCF via a P-GW. The P-CSCF can send an AAR message to a PCRF over an Rx interface to request setup of a dedicated bearer for the VoLTE call. The PCRF can find an existing Gx session with a P-GW handing traffic for that UE based on the PCRF's stored Gx binding information, and send PCC rules applicable to a VoLTE call to the P-GW over the Gx session. The P-GW can accordingly set up a dedicated bearer and apply the received PCC rules to traffic associated with that dedicated bearer. The PCRF can also return an AAA message to the P-CSCF confirming that the dedicated bearer has been set up with appropriate PCC rules.

However, when a PCRF receives an AAR message from an application function about a particular UE, in some situations the PCRF may not be able to find Gx binding information about a previously established Gx session associated with that UE. For example, a PCRF's Gx binding information may become corrupt, a process in the PCRF that locates Gx binding information may become misconfigured, or the PCRF may not be able to locate corresponding Gx binding information within a predetermined period of time. Accordingly, even though a Gx session may have already been established between the PCRF and the gateway handling traffic for the UE, the PCRF may not be able to find information about that existing Gx session. As such, the PCRF may not be able to use its Gx binding information to identify the particular gateway associated with the UE, or use the established Gx session to provide PCC rules to that gateway that would cause setup or modification of the network resources as requested by the application function. In these situations, the PCRF can be configured to return an error message to the application function indicating that it cannot find a corresponding Gx session, such as a 5065 "IP-CAN_SESSION_NOT_AVAILABLE" message. The application function can in turn send a message to the UE indicating that network resources for the requested service could not be set up.

As such, when a PCRF's Gx binding information fails, a UE may not be able to establish a VoLTE call or other requested type of communication through a packet-switched network. For instance, when an application function receives an error message from the PCRF as a result of Gx binding information failure, the application function can return a message to the UE indicating that the requested service could not be implemented. Alternately, if a failure of Gx binding information causes the PCRF to delay returning a response to the application function, a timer started by the UE when it made its request to the application function can expire, and the UE can consider the communication attempt through the application function to have failed. In these situations, if the UE is located in an area that is not covered by a circuit-switched network, the UE may have no fallback options and its call attempt can fail. However, if the UE is covered by a circuit-switched network, the UE can fall back to the circuit-switched network to retry its call.

However, although a circuit-switched network does not involve interactions between a packet core network, an IMS, and/or a PCRF, and as such is not directly impacted by the failure of PCRF's Gx binding information, the Gx binding information failure can have a large indirect impact on the circuit-switched network. For example, when a PCRF's Gx binding information fails, calls from numerous UEs can fail on a packet-switched network for the reasons described above. Consequently, numerous UEs can be pushed to retry their calls on a circuit-switched network. If the circuit-switched network is not prepared for a sudden spike in traffic caused by a Gx binding information failure in a packet-switched network, the circuit-switched network can become overloaded and many of the calls retried on the circuit-switched network can also fail.

This disclosure describes systems and processes in which a PCRF can maintain a mapping table that links UE IP addresses with corresponding gateways. In the event that an application function sends an AAR message to the PCRF about a particular UE, but the PCRF cannot find an established Gx session with a gateway for that UE based on the PCRF's Gx binding information, the PCRF can use the mapping table as a backup to identify the gateway associated with the UE's IP address. The PCRF can accordingly contact that gateway to restore a previously established Gx session or create a new Gx session. A PCRF can then send applicable PCC rules to the gateway over the new or restored Gx session and return an AAA message to the application function, thereby avoiding returning an error message to the application function and pushing the UE to retry its call on a circuit-switched network.

Although interactions over Gx interfaces between PCRFs and gateways of a packet core network are described herein, in some examples a packet-switched network can include elements known by other names that perform the same or similar operations and interact over a Gx interface or similar interface. For example, 5G networks may include a User Plane Function (UPF) that performs operations similar to a P-GW and a Policy Control Function (PCF) that performs operations similar to a PCRF. Accordingly, a PCF can be considered to be the PCRF described herein, while a UPF can be considered to be a P-GW or other gateway described herein. For example, Gx sessions or similar sessions can be established between a PCF and a UPF for particular UEs, and the PCF can store binding information about those sessions. In the event that the such binding information becomes unavailable or inaccessible, the PCF can use a mapping table to identity a UPF associated with a UE and contact that UPF to restore or rebuild a previous session, using operations similar to the session restoration operations described herein between a PCRF and a gateway.

Example Environment

FIG. 1 depicts an example network environment in which user equipment (UE) 102 can connect to a telecommunication network 104 to engage in communication sessions for voice calls, video calls, data transfers, or any other type of communication. A UE 102 can be any device that can wirelessly connect to the telecommunication network 104. For example, a UE 102 can be a smart phone, a cellular phone, a personal digital assistant (PDA), a personal computer (PC), a laptop, a desktop, a workstation, a media player, a tablet, a gaming device, a smart watch, or any other type of computing or communication device.

Elements of the telecommunication network 104 can be based on one or more wireless access technologies and/or provide network access to UEs 102 through one or more wireless access technologies. For example, wireless access technologies can include fifth generation (5G) technology, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, and WiFi® technology.

The telecommunication network 104 can include network elements that process communications in a packet-switched domain, including a packet core network 106, an IP Multimedia Subsystem (IMS) 108, and a Policy and Charging Rules Function (PCRF) 110. A packet core network 106 can process and/or route data packets, while an IMS 108 can assist in setup and/or management of services that use such data packets during communication sessions. For example, a packet core network 106 can be a core network of an LTE network, and the packet core network 106 can be linked to an IMS 108 that sets up and/or manages Voice over LTE (VoLTE) calls. Other networks that handle voice calls and other types of communications in a packet-switched domain, such as many 5G networks and 4G networks, can similarly have a packet core network 106 and an IMS 108. In some types of networks a PCRF 110 may be known by another name, or be replaced with another element that performs the same or similar functions. For example, in a 5G network a Policy Control Function (PCF) can perform operations similar to a PCRF 110. Accordingly, descriptions of the PRCF 110 herein may also be applicable to other elements such as a PCF that performs similar operations, or a PCF can be considered to be the PRCF 110 described herein.

In some examples, a telecommunication network 104 can additionally include one or more legacy circuit-switched networks 112. Legacy circuit-switched networks 112 can be networks that handle calls in a circuit-switched domain by transmitting the calls through dedicated circuits established between network nodes. For example, many 2G and 3G networks handle voice calls in a circuit-switched domain. Accordingly, although a telecommunication network 104 can prioritize handling calls in a packet-switched domain using a packet core network 106, IMS 108, and/or PCRF 110, in some cases a call can be attempted and/or retried on a legacy circuit-switched network 112 if it cannot be connected through the packet core network 106, IMS 108, and/or PCRF 110 as discussed below.

A UE 102 can connect to the telecommunication network 104 through a connection to a base station or other access point (not shown). For example, a telecommunication network 104 can include many base stations to which UEs 102 can connect, such as Node Bs (NBs) of a 3G legacy circuit-switched network 112, eNode Bs (eNBs) of an LTE packet core network 106, and/or base stations of a 5G packet core network 106 (referred to as "gNBs"). In some examples, UEs 102 can connect to the telecommunication network 104 via other types of access points and connections, such as a connection over the Internet via a Wi-Fi access point.

As shown in FIG. 1, a packet core network 106 can include a plurality of gateways 114. In some examples, gateways can be Packet Data Network (PDN) Gateways (P-GWs) that link the packet core network 106 to at least one IMS 108 for one or more services, and/or link the packet core network 106 to other networks or entities, such as the Internet. In some types of networks a gateway 114 may be known by another name, or be replaced with another element that performs the same or similar functions. For example, in a 5G network a User Plane Function (UPF) can perform operations similar to a P-GW. Accordingly, descriptions of the gateways 114 herein may also be applicable to other elements such as a UPF that performs similar operations or a UPF can be considered to be a gateway 114 described herein.

A packet core network 106 can also include other nodes and/or elements that are not shown in FIG. 1. For example, the packet core network 106 can include a Mobility Management Entity (MME), a control node that can assist with set up and management of default and dedicated bearers based on instructions from a gateway 114, authenticate subscribers in conjunction with a Home Subscriber Server (HSS), and/or perform other network functions.

When a UE 102 connects to a packet core network 106, the UE 102 can be assigned to a particular gateway 114, such as a P-GW, that can process and route data packets associated with that UE 102. As will be discussed further below, each gateway 114 can have a different range of IP addresses that can be assigned to UEs 102 that connect to those gateways 114. Accordingly, when a UE 102 connects to a particular gateway 114, the UE 102 can be assigned a particular IP address that is available within that gateway's range of IP addresses.

A gateway 114 can also cause resources to be set up for a communication session within the packet core network 106 for a particular UE 102. For example, a gateway 114 can set up default and dedicated bearers for a UE 102 within the packet core network 106, or cause other elements of the packet core network 106 to set up such bearers. A default bearer can be set up to handle traffic related to setup and management of a communication session. For example, Session Initiation Protocol (SIP) messages from a UE 102 to an IMS 108 can be transmitted through the packet core network 106 over a default bearer. A dedicated bearer can be set up to handle traffic associated with a particular service or data type during the communication session. For example, a dedicated bearer can be set up for data packets of a VoLTE call.

A PCRF 110 can be connected to both the packet core network 106 and the IMS 108 as described further below. In some examples, a PCRF 110 can be, or can run on, a network node such as a server or other computing device. Example architecture for a PCRF node is illustrated in greater detail in FIG. 3, and is described in detail below with reference to that figure.

A PCRF 110 can maintain Policy and Charging Control (PCC) policies corresponding to attributes of communication session types, service types, subscriber or account types, a Quality of Service (QoS) level, and/or any other factor. PCC policies can define PCC rules 116 that can be applied to data packets of particular communication sessions. For example, PCC rules 116 can specify that data packets of a communication session should be given a certain priority level, be transmitted at at least a minimum bitrate, be transmitted on certain bearers, and/or be treated in any other specified way. In some examples, PCC rules 116 can also define how a customer account is to be charged based on how data packets are transmitted or treated during a communication session.

A PCRF 110 can be connected to gateways 114 through Gx interfaces, which allows the PCRF 110 and gateways 114 to exchange messages using the Diameter protocol. Accordingly, when a Gx session has been established between a PCRF 110 and a gateway 114 with respect to a UE 102, the PCRF 110 can use the established Gx session to provide the gateway 114 with PCC rules 116 applicable to communication sessions for that UE 102.

When a gateway 114 receives such PCC rules 116 for a communication session from a PCRF 110, it can apply the PCC rules 116 to data packets of the communication session that pass through the gateway 114. For example, a P-GW can have a Policy and Charging Enforcement Function (PCEF) that analyses data packets, determines which communication session the data packets are associated with, and applies any applicable PCC rules 116 to those data packets. In some cases, if the PCC rules 116 apply to a type of bearer that has not yet been set up in the packet core network 106, such as a default bearer or dedicated bearer, receipt of the PCC rules 116 can cause the gateway 114 to set up that type of bearer and then apply the PCC rules 116 to traffic associated with that bearer.

A PCRF 110 can store Gx binding information 118 about Gx sessions that have been established between the PCRF 110 and one or more gateways 114. For example, when a UE 102 first connects to a P-GW, the P-GW can establish a Gx session with a PCRF in order to obtain default PCC rules 116 for a default bearer associated with that UE 102. In some examples, a Gx session can be established when a P-GW or other gateway 114 sends an Initial Credit Control Request (CCR-I) message to the PCRF 110 that includes information about the UE 102, such as the UE's IP address. The PCRF 110 can reply with an Initial Credit Control Answer (CCA-I) message containing PCC rules 116 applicable to a default bearer. The exchange of the CCR-I and CCA-I messages can establish a Gx session between the PCRF 110 and the gateway 114 associated with the UE 102. The PCRF 110 and the gateway 114 can both store information about the Gx session, including a Gx session identifier. In particular, the PCRF 110 can save information about the established Gx session in its Gx binding information 118. Gx binding information 118 can be stored at a PCRF 110 as a table, a database, or any other type of data.

A PCRF 110 can maintain Gx binding information 118 about multiple established Gx sessions with different gateways 114 and/or for different UEs 102. Accordingly, when a PCRF 110 needs to send a message to a gateway 114 about a communication session for a particular UE 102, the PCRF 110 can use its Gx binding information 118 to identify a previously established Gx session associated with that UE 102 and/or the particular gateway 114 associated with that UE 102. The PCRF 110 can then use that information to send the message, such as new or updated PCC rules 116, to the gateway 114 over the established Gx session.

An IMS 108 can include nodes and/or application functions 120 that perform various operations to implement a particular service with respect to a communication session, such as services for voice calls, video calls, or any other type of communication. An application function 120 can be linked to a PCRF 110 through an Rx interface, which allows the application function 120 and the PCRF 110 to exchange messages using the Diameter protocol. Although the application function 120 shown in FIG. 1 is within an IMS 108, in other examples an application function 120 can be positioned at any other network location.

In some examples, an application function 120 can be a Session Border Controller (SBC) or Call Session Control Function (CSCF) that can process messages sent to or from the IMS 108, such as a SIP message from a UE 102 requesting setup of a VoLTE call. CSCFs can include Proxy CSCFs (P-CSCFs), Interrogating-CSCFs (I-CSCFs), and/or a Serving-CSCFs (S-CSCFs). For example, an application function 120 can be a P-CSCF positioned at an entry point to an IMS 108, such that it can be in communication with P-GWs of the packet core network 106 and thereby exchange SIP messages with a particular UE 102 through a P-GW associated with that UE 102.

As noted above, a P-CSCF or other application function 120 can receive a message via a gateway 114, such as a SIP message from a UE 102 requesting a particular service. The message can include a source IP address of a UE 102. Upon receipt of such a message, the application function 120 can use an Rx session with a PCRF 110 to send an Authorize/Authenticate Request (AAR) message to the PCRF 110. The AAR message can also include the source IP address of the UE 102, and/or request setup or modification of network resources for the requested service. For example, an AAR message can request setup of a dedicated bearer for the requested service, which can cause the PCRF 110 to send PCC rules 116 for a new dedicated bearer to the gateway 114 associated with the UE 102. Thereafter, the application function 120 can receive an Authorize/Authenticate Answer (AAA) message from the PCRF 110 via the Rx session confirming that the requested resources have been set up or modified. After receiving that confirmation, the application function 120 can continue with setup or management of the requested service.

As an example, when a UE 102 has connected to a P-GW and attempts to initiate a VoLTE call, the UE 102 can send a SIP INVITE message via the packet core network 106 to that P-GW. The P-GW can in turn send the SIP INVITE message to a P-CSCF in the IMS 108. The P-CSCF can determine that the SIP INVITE is requesting a VoLTE call and send an AAR message to the PCRF 110 over an Rx interface asking that a dedicated bearer be set up in the packet core network 106 for the VoLTE call. The P-CSCF can include the UE's IP address in the AAR message, such that the PCRF 110 can use its Gx binding information 118 to find an existing Gx session with a P-GW corresponding to that UE 102. The PCRF 110 can then send applicable PCC rules 116 to the P-GW over the identified Gx session. For instance, the PCC rules 116 can cause the P-GW to set up a dedicated bearer for the VoLTE call and apply the PCC rules 116 to traffic associated with that dedicated bearer. The PCRF 110 can also return an AAA message to the P-CSCF over the Rx interface confirming that the requested dedicated bearer has been set up. Thereafter, the P-CSCF can forward the UE's SIP request to one or more other CSCFs in the IMS 108 that continue with setup and/or management of the VoLTE call over the dedicated bearer.

A PCRF 110 can also maintain a mapping table 122 in addition to the Gx binding information 118. FIG. 2 depicts an example of a mapping table 122. A mapping table 122 can map gateway identifiers 202 for one or more gateways 114 to UE IP address ranges 204 associated with those gateways 114. Gateway identifiers 202 can be names, network addresses, and/or other identifiers of particular gateways 114 in the packet core network 106, such as particular P-GWs. The UE IP address ranges 204 can be ranges of IP addresses that can be assigned to UEs 102 that connect to associated gateways 114. When a UE 102 connects to a particular gateway 114, such as a P-GW, the UE 102 can be assigned an IP address that is available within the UE IP address range 204 associated with that gateway 114. Accordingly, the PCRF 110 can maintain a mapping table 122 that tracks the UE IP address ranges 204 associated with gateway identifiers 202 of multiple gateways 114.

The PCRF's mapping table 122 can be built and/or updated based on information received from gateways 114, network administrators, or other entities about the UE IP address ranges 204 associated with particular gateways 114. For example, when a new P-GW is installed in the packet core network 106, a new UE IP address range 204 associated with that new P-GW can be added to the mapping table 122. Similarly, when an existing P-GW is reconfigured to have a different UE IP address range 204, the UE IP address range 204 associated with that P-GW can be updated in the mapping table 122.

In some examples, a mapping table 122 can be stored in local memory at a PCRF 110. However, in other examples a mapping table 122 can be stored at another network location, such that a PCRF 110 can remotely access the mapping table 122 when needed, or periodically update its own local copy of the mapping table 122 based on a remote copy of the mapping table 122.

When a PCRF 110 receives an AAR message about a UE 102 from an application function 120, the PCRF 110 can attempt to locate Gx binding information 118 about a Gx session previously established with a gateway 114 for that UE 102. However, in some situations the PCRF 110 may be unable to locate Gx binding information 118 associated with a particular UE 102, and therefore be unable to use its Gx binding information 118 to identify the gateway 114 associated with that UE 102. For example, the PCRF 110 may be unable to locate Gx binding information 118 associated with a UE 102 if the PCRF's Gx binding information 118 has become corrupted, if a software application process or thread that handles lookups of the Gx binding information 118 experiences an error or becomes misconfigured, if the PCRF 110 cannot find the associated Gx binding information 118 within a predetermined period of time, or if the PCRF's Gx binding information 118 is unavailable for any other reason.

Accordingly, in situations in which the PCRF 110 cannot locate Gx binding information 118 associated with a UE 102, and therefore cannot use the Gx binding information 118 to identify the particular gateway 114 associated with that UE 102, the PCRF 110 can use its mapping table 122 as a backup to identify the gateway 114 associated with that UE 102. When a PCRF 110 receives an AAR message from an application function 120 that includes an IP address for a UE 102, the PCRF 110 can determine which UE IP address range 204 in the mapping table 122 covers that IP address. The PCRF 110 can accordingly find the gateway identifier 202 associated with that UE IP address range 204. Because the UE 102 was likely assigned an available IP address within that UE IP address range 204 when it connected to a corresponding gateway 114, the associated gateway identifier 202 can identify the gateway 114 that is handling traffic for the UE 102.

In some examples, the PCRF 100 can maintain the mapping table 122 at a different memory location and/or partition than the Gx binding information 118, such that a memory storage failure that impacts the Gx binding information 118 may be less likely to impact the mapping table 122. Similarly, in some examples the PCRF 100 can have separate application processes or threads for looking up information in the Gx binding information 118 and the mapping table 122, such that a failure of the process or thread that looks up Gx binding information 118 may be less likely to impact lookups in the mapping table 122.

After using the mapping table 122 to find a gateway identifier 202 associated with the UE's IP address, the PCRF 110 can use a Gx interface to contact the gateway 114 associated with the gateway identifier 202. The PCRF 110 can send a message to the gateway 114 indicating that it cannot find a previously-existing Gx session with the gateway 114 for the UE 102 and wants to restore the Gx session or create a new Gx session. For example, the PCRF 110 can send a session initiation request message to the gateway 114 containing a flag, attribute-value pair, or other content that signals a request to restore a Gx session or create a new Gx session.

In some examples, although the PCRF 110 may have lost Gx binding information 118 about a Gx session previously established between the gateway 114 and the PCRF 110 as described above, the gateway 114 may still have its own information about that previously established Gx session. Accordingly, when the PCRF 110 informs the gateway 114 that it cannot find an established Gx session, the gateway 114 can respond with information about the previously established Gx session so that the Gx session can be restored or rebuilt between the PCRF 110 and the gateway 114. For instance, upon receipt of a session initiation request message from a PCRF 110, a gateway 114 can send a CCR message or other message to the PCRF 110 that contains a Gx session identifier and/or other information about the previously established Gx session.

In other examples, when the PCRF 110 identifies a gateway 114 based on the mapping table 122, the PCRF 110 can establish a new Gx session with that gateway 114 to replace a previously existing Gx session. For instance, upon receipt of a session initiation request message from a PCRF 110, a gateway 114 can send a new CCR-I message to the PCRF 110 and the PCRF 110 can reply with a CCA-I message to establish a new Gx session.

Accordingly, when a PCRF 110 receives an AAR message about a UE 102 from an application function 120 but cannot find corresponding Gx binding information 118, the PCRF 110 can use its mapping table 122 to restore a Gx session or create a new Gx session with the gateway 114 associated with the UE 102. The PCRF 110 can then use the restored or new Gx session to provide the gateway 114 with PCC rules 116 based on the AAR message, and return an AAA message to the application function 120. Consequently, the PCRF 110 can avoid returning error messages to application functions 120 when Gx binding information 118 is unavailable, such as a 5065 "IP-CAN_SESSION_NOT_AVAILABLE" message, which might otherwise lead to call attempts failing and/or UEs 102 retrying their calls on a legacy circuit-switched network 112 that may become overloaded with a sudden spike in activity.

Additionally, when a mapping table 122 is used to restore a Gx session or create a new Gx session as described above, in some examples a PCRF 110 can add information about the restored or new Gx session to its Gx binding information 118. As such, when a PCRF's Gx binding information 118 becomes lost or corrupted, the Gx binding information 118 can be rebuilt or repaired based on the PCRF's interactions with gateways 114 identified through the mapping table 122.

Example Architecture

Figure 3:
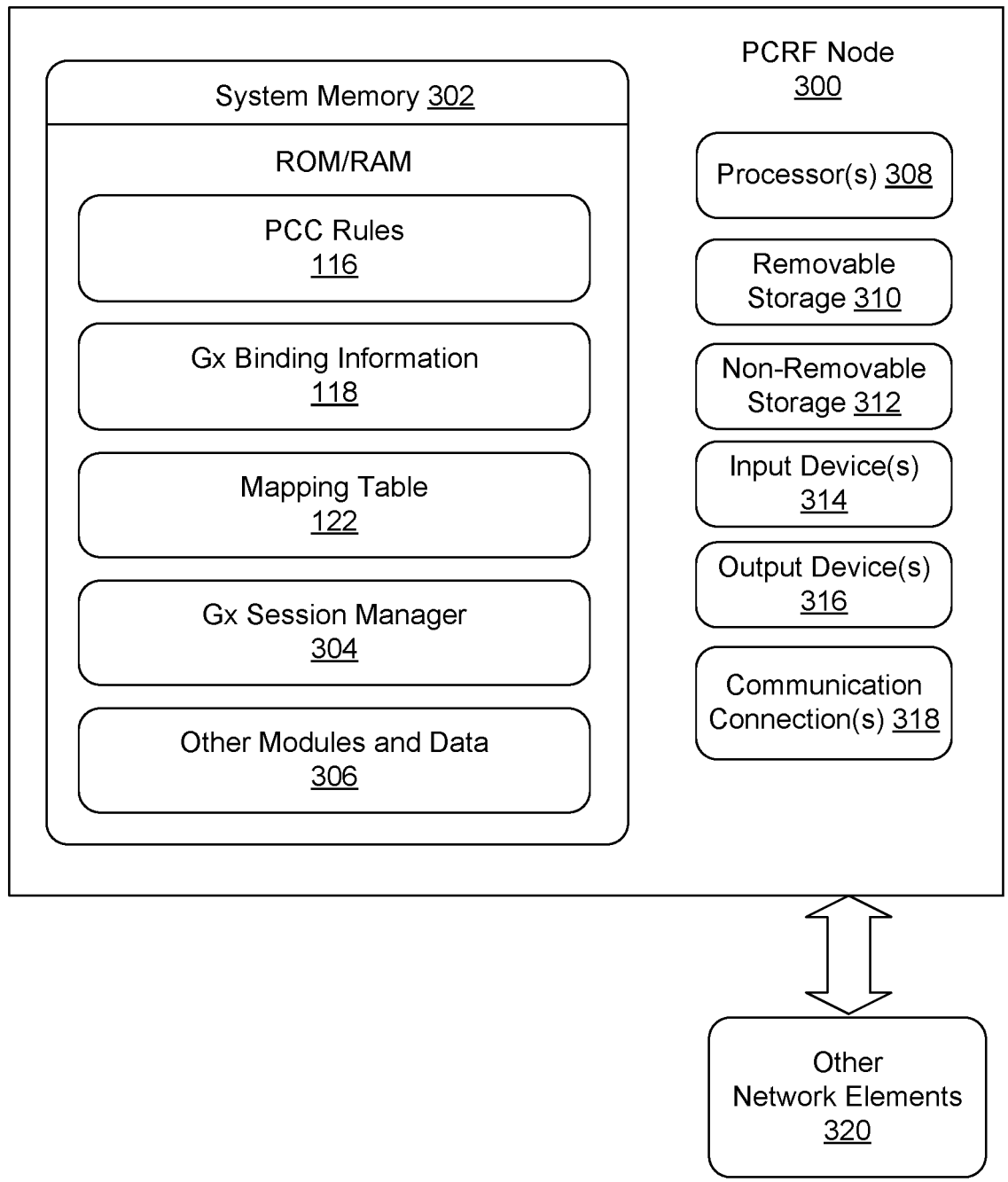
FIG. 3 illustrates an example architecture of a PCRF node.

FIG. 3 illustrates an example architecture of a PCRF node 300. A PCRF 110 can be, or can run on, a server or other computing device, such as a PCRF node 300. A PCRF node 300 can have a system memory 302. The system memory 302 can store data for the PCRF 110, including PCC rules 116, Gx binding information 118, a mapping table 122, a Gx session manager 304, and/or other modules and data 306. The PCRF node 300 can also include processor(s) 308, removable storage 310, non-removable storage 312, input device(s) 314, output device(s) 316, and/or communication connections 318 for communicating with other network elements 320.

In various examples, system memory 302 can be volatile (such as RAM), non-volatile (such as ROM, flash memory, etc.), or some combination of the two. Example system memory 302 can include one or more of RAM, ROM, EEPROM, a Flash Memory, a hard drive, a memory card, an optical storage, a magnetic cassette, a magnetic tape, a magnetic disk storage or another magnetic storage devices, or any other medium. In some examples, the Gx binding information 118 and the mapping table 122 can be stored at different locations and/or partitions within the system memory 302, such that the mapping table 122 can remain accessible if the memory location or partition storing the Gx binding information 118 becomes inaccessible.

The Gx session manager 304 can receive an AAR message from an application function 120, and attempt to identify a corresponding Gx session in previously stored Gx binding information 118. If it can identify a corresponding Gx session, it can forward applicable PCC rules 116 to a gateway 114 over the Gx session. However, if the Gx session manager 304 cannot find a corresponding Gx session in the Gx binding information 118, it can use the mapping table 122 to identify a gateway 114 that corresponds to a UE IP address contained in the AAR message. The Gx session manager 304 can contact that gateway 114 over a Gx interface to restore a previously established Gx session or establish a new Gx session. Thereafter, the Gx session manager 304 can forward applicable PCC rules 116 to the gateway 114 over the restored or new Gx session. In some examples, the Gx session manager 304 can have separate processes or threads for analyzing the Gx binding information 118 and the mapping table 122, such that failure of one for the Gx binding information 118 may be unlikely to impact the other one for the mapping table 122. Alternately, the PCRF 110 can have one Gx session manager 304 for the Gx binding information 118 and another Gx session manager 304 for the mapping table 112, such that failure of the one for the Gx binding information 118 may be unlikely to impact the other one for the mapping table 122.

The other modules and data 306 can be utilized by the PCRF 110 to perform or enable performing any action taken by the PCRF 110. The other modules and data 306 can include a platform and applications, and data utilized by the platform and applications.

In some embodiments, the processor(s) 308 can be a central processing unit (CPU), a graphics processing unit (GPU), both CPU and GPU, or other processing unit or component known in the art.

The PCRF node 300 can also include additional data storage devices (removable and/or non-removable) such as, for example, magnetic disks, optical disks, or tape. Such additional storage is illustrated in FIG. 3 by removable storage 310 and non-removable storage 312. Computer storage media may include volatile and nonvolatile, removable and non-removable media implemented in any method or technology for storage of information, such as computer readable instructions, data structures, program modules, or other data. System memory 302, removable storage 310 and non-removable storage 312 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the PCRF 110. Any such computer-readable storage media can be part of the PCRF node 300. In various examples, any or all of system memory 302, removable storage 310, and non-removable storage 312, store programming instructions which, when executed, implement some or all of the above-described operations of the PCRF 110.

In some examples, the PCRF node 300 can also have input device(s) 314, such as a keyboard, a mouse, a touch-sensitive display, voice input device, etc., and/or output device(s) 316 such as a display, speakers, a printer, etc. These devices are well known in the art and need not be discussed at length here.

The PCRF node 300 can also contain communication connections 318 that allow the PCRF 110 to communicate with other network elements 320, such as gateway 114 and application functions 120. For example, a communication connection 318 can communicate with one or more gateways 114 over Gx interfaces using messages based on the Diameter protocol, as described above. As another example, a communication connection 318 can communicate with one or more application functions 120 over Rx interfaces using messages based on the Diameter protocol, as described above.

Example Operations

Figure 4:
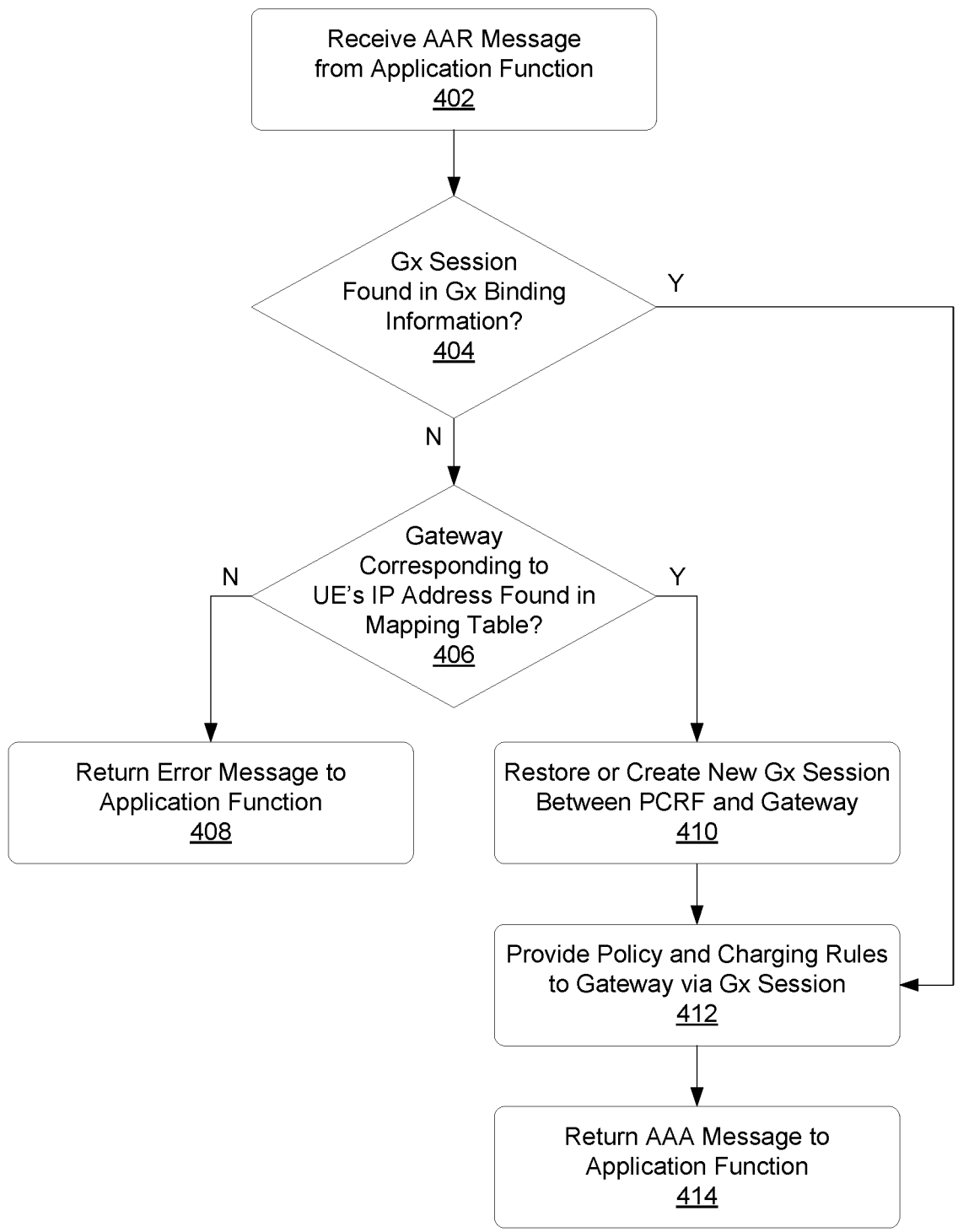
FIG. 4 depicts a flow chart of an exemplary process for providing Policy and Charging Control (PCC) rules from a PCRF to a gateway over a Gx session.

FIG. 4 depicts a flow chart of an exemplary process for providing PCC rules 116 from a PCRF 110 to a gateway 114 over a Gx session.

At block 402, the PCRF 110 can receive an AAR message over an Rx interface from an application function 120. The AAR message can contain an IP address for a UE 102. For example, a UE 102 can have provided its IP address to a P-CSCF in a SIP message, and the P-CSCF can include that IP address in an AAR message it sends to the PCRF 110.

At block 404, the PCRF 110 can attempt to locate Gx binding information 118 about a Gx session previously established between the PCRF 110 and a gateway 114 associated with the UE 102, such as a P-GW. If the PCRF 110 locates such Gx binding information 118, the PCRF 110 can use the established Gx session at block 412 to provide the gateway 114 with PCC rules 116 based on the AAR message, such as new or different PCC rules 116 for a dedicated bearer.

However, if the PCRF 110 cannot locate Gx binding information 118 corresponding to the AAR message during block 404, the PCRF 110 can move to step 406. For example, the PCRF 110 can move to step 406 if its Gx binding information 118 has become corrupted, if a process or thread that identifies corresponding Gx binding information 118 has been misconfigured, if the PCRF 110 cannot locate corresponding Gx binding information 118 within a predetermined period of time, or if the Gx binding information 118 is unavailable for any other reason.

At block 406, the PCRF 110 can attempt to use its mapping table 122 to find a gateway 114 that corresponds to the UE IP address in the AAR message. The PCRF 110 can determine if a UE IP address range 204 in the mapping table 122 covers the UE IP address, and if so find a gateway identifier 202 associated with that UE IP address range 204 in the mapping table 122. If the PCRF 110 cannot find a gateway identifier 202 in the mapping table 122 that corresponds with the UE IP address in the AAR message during block 406, the PCRF 110 can move to block 408 and return an error message over the Rx interface to the application function 120 that sent the AAR message. In some examples, the error message can be a 5065 "IP-CAN_SESSION_NOT_AVAILABLE" message. However, if the PCRF 110 does find a gateway identifier 202 in the mapping table 122 that corresponds with the UE IP address in the AAR message during block 406, the PCRF 110 can move to block 410.

At block 410, the PCRF 110 can use the gateway identifier 202 found during block 406 to contact the gateway 114 handling traffic for the UE 102 identified by the IP address included in the AAR message. In some examples, the PCRF 110 can request that the gateway 114 provide information about a Gx session previously established between the PCRF 110 and the gateway 114 for the UE 102. In other examples, the PCRF 110 can request that a new Gx session be established for the UE 102 between the PCRF 110 and the gateway 114. Accordingly, during block 410 the PCRF 110 and the gateway 114 can establish a Gx session for the UE 102 as either a restored Gx session or a new Gx session. In some examples, the PCRF 110 can store information about the new or restored Gx session in its Gx binding information, such that it can identify the Gx session at block 404 in response to other AAR messages in the future.

At block 412, the PCRF 110 can use the Gx session established between the PCRF 110 and the gateway 114 to provide the gateway 114 with PCC rules 116 based on the AAR message, such as new or different PCC rules 116 for a dedicated bearer. In some examples, the gateway 114 can reply via the Gx session to confirm that it has set up or modified network resources based on the received PCC rules 116.

At block 414, the PCRF 110 can return an AAA message to the to the application function 120 that sent the AAR message. In some examples, the PCRF 110 can send the AAA message after successfully sending the PCC rules 116 to the gateway 114 over a Gx session, such as a new or restored Gx session established during block 410, and/or after receiving a reply from the gateway 114 indicating that the gateway 114 has set up or modified network resources based on the received PCC rules 116.

After the application function 120 that sent the AAR message receives an AAA message from the PCRF 110 at block 414, it can proceed with operations to continue setup or management of a requested service for the UE 102. For example, when a P-CSCF received a SIP message from a UE 102 requesting setup of a VoLTE call and sent an AAR message to the PCRF 110 to cause a dedicated bearer to be set up with PCC rules 116 applicable to a VoLTE call for that UE 102, the P-CSCF can forward the SIP request to another CSCF in the IMS 108 to continue operations associated with the VoLTE call after receiving an AAA message from the PCRF 110 indicating that the dedicated bearer is in place. In some cases, the P-CSCF can also send a SIP message to the UE 102 indicating that the dedicated bearer is in place following receipt of the AAA message.

CONCLUSION

As described above, in some situations Gx binding information 118 can fail at a PCRF 110, causing the PCRF 110 to be unable to find information about previously established Gx sessions with gateways 114 in the Gx binding information 118. Rather than returning an error message that can cause communication attempts to fail or fall back to potentially overloaded legacy circuit-switched networks 112, the PCRF 110 can use a mapping table 122 to identify a gateway 114 associated with a UE's IP address. The PCRF 110 can then contact the identified gateway 114 to restore a previously established Gx session or establish a new Gx session, which can be used to provide the gateway 114 with applicable PCC rules 116.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   maintaining, by a Policy and Charging Rules Function (PCRF), a mapping table that associates a plurality of gateway identifiers with a plurality of IP address ranges, the plurality of gateway identifiers corresponding to a plurality of gateways in a packet core network;
   determining, by the PCRF, an IP address of a user equipment (UE);
   determining, by the PCRF from the mapping table, a particular IP address range of the plurality of IP address ranges that covers the IP address;
   determining, by the PCRF from the mapping table, a particular gateway identifier of the plurality of gateway identifiers that corresponds to the particular IP address range; and
   based on determining the particular gateway identifier from the mapping table, establishing, by the PCRF, a Gx session for the UE between the PCRF and a particular gateway in the packet core network that corresponds to the particular gateway identifier.

2. The method of claim 1, wherein establishing the Gx session comprises restoring a previously established Gx session between the PCRF and the particular gateway.

3. The method of claim 1, wherein establishing the Gx session comprises establishing a new Gx session between the PCRF and the particular gateway.

4. The method of claim 1, wherein the determining the particular IP address range, determining the particular gateway identifier, and establishing the Gx session is performed in response to a determination that the PCRF is unable to find Gx binding information identifying an existing Gx session for the UE previously established between the PCRF and any of the plurality of gateways.

5. The method of claim 1, further comprising sending, by the PCRF, Policy and Charging Control rules for traffic associated with the UE to the particular gateway over the Gx session.

6. The method of claim 1, wherein the IP address is included in an Authorize/Authenticate Request message received by the PCRF from an application function of an IP Multimedia Subsystem via an Rx interface.

7. The method of claim 6, wherein the application function is a Proxy-Call Session Control Function.

8. The method of claim 1, wherein the plurality of gateways are Packet Data Network Gateways that link the packet core network to an IP Multimedia Subsystem.

9. A Policy and Charging Rules Function (PCRF) node of a telecommunication network, comprising:
   one or more processors;
   a communication connection configured to exchange information over a Gx interface;
   memory storing a mapping table that associates a plurality of gateway identifiers with a plurality of IP address ranges, the plurality of gateway identifiers corresponding to a plurality of gateways in a packet core network, and computer-executable instructions that, when executed by the one or more processors, cause the one or more processors to perform operations comprising:
   determining an IP address of a user equipment (UE);
   determining, from the mapping table, a particular IP address range of the plurality of IP address ranges that covers the IP address;
   determining, the mapping table, a particular gateway identifier of the plurality of gateway identifiers that corresponds to the particular IP address range; and
   based on determining the particular gateway identifier from the mapping table, establishing, via the communication connection, a Gx session for the UE between the PCRF node and a particular gateway in the packet core network that corresponds to the particular gateway identifier.

10. The PCRF node of claim 9, wherein establishing the Gx session comprises restoring a previously established Gx session between the PCRF node and the particular gateway.

11. The PCRF node of claim 9, wherein establishing the Gx session comprises establishing a new Gx session between the PCRF node and the particular gateway.

12. The PCRF node of claim 9, wherein the determining the particular IP address range, determining the particular gateway identifier, and establishing the Gx session is performed in response to a determination that the PCRF node is unable to find Gx binding information identifying an existing Gx session for the UE previously established between the PCRF node and any of the plurality of gateways.

13. The PCRF node of claim 9, wherein the operations further comprise sending Policy and Charging Control rules for traffic associated with the UE to the particular gateway over the Gx session.

14. The PCRF node of claim 9, wherein the IP address is included in an Authorize/Authenticate Request message received by the PCRF node from an application function of an IP Multimedia Subsystem via an Rx interface.

15. One or more non-transitory computer-readable media storing computer-executable instructions that, when executed by one or more processors associated with a Policy and Charging Rules Function (PCRF), cause the one or more processors to perform operations comprising:

> maintaining a mapping table that associates a plurality of gateway identifiers with a plurality of IP address ranges, the plurality of gateway identifiers corresponding to a plurality of gateways in a packet core network;
> determining an IP address of a user equipment (UE);
> determining, from the mapping table, a particular IP address range of the plurality of IP address ranges that covers the IP address;
> determining, from the mapping table, a particular gateway identifier of the plurality of gateway identifiers that corresponds to the particular IP address range; and
> based on determining the particular gateway identifier from the mapping table, establishing a Gx session for the UE between the PCRF and a particular gateway in the packet core network that corresponds to the particular gateway identifier.

16. The one or more non-transitory computer-readable media of claim 15, wherein establishing the Gx session comprises restoring a previously established Gx session between the PCRF and the particular gateway.

17. The one or more non-transitory computer-readable media of claim 15, wherein establishing the Gx session comprises establishing a new Gx session between the PCRF and the particular gateway.

18. The one or more non-transitory computer-readable media of claim 15, wherein the determining the particular IP address range, determining the particular gateway identifier, and establishing the Gx session is performed in response to a determination that the PCRF is unable to find Gx binding information identifying an existing Gx session for the UE previously established between the PCRF and any of the plurality of gateways.

19. The one or more non-transitory computer-readable media of claim 15, wherein the operations further comprise sending Policy and Charging Control rules for traffic associated with the UE to the particular gateway over the Gx session.

20. The one or more non-transitory computer-readable media of claim 15, wherein the IP address is included in an Authorize/Authenticate Request message received by the PCRF from an application function of an IP Multimedia Subsystem via an Rx interface.

* * * * *